Re. 24217

Aug. 23, 1955     D. E. MILLER     2,715,938

TRACTOR SEAT

Filed July 22, 1953                     2 Sheets-Sheet 1

Delmer E. Miller
*INVENTOR.*

BY *Clarence A. O'Brien*
*and Harvey B. Jacobson*
*Attorneys*

Aug. 23, 1955     D. E. MILLER     2,715,938
TRACTOR SEAT
Filed July 22, 1953     2 Sheets-Sheet 2
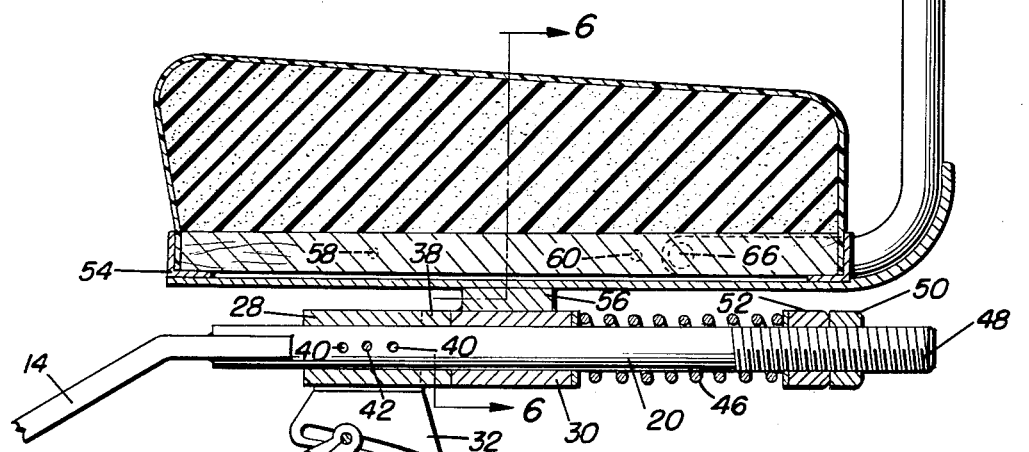
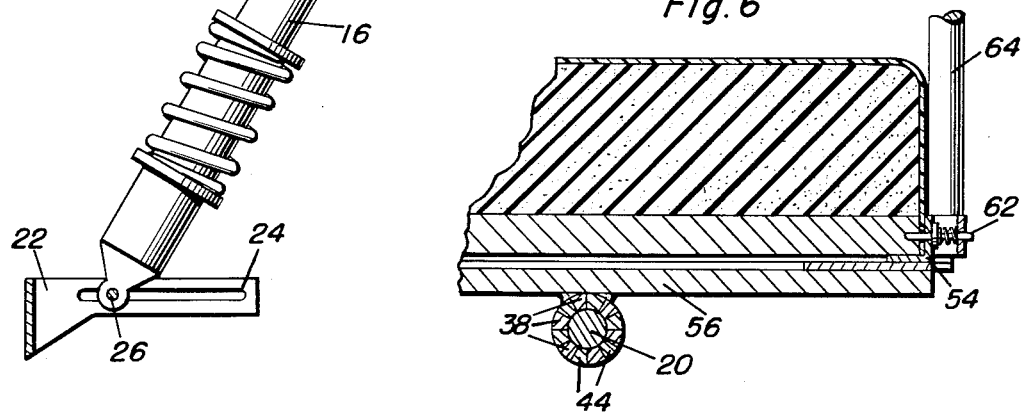
Delmer E. Miller
INVENTOR.

United States Patent Office 2,715,938
Patented Aug. 23, 1955

2,715,938

TRACTOR SEAT

Delmer E. Miller, De Witt, Mo.

Application July 22, 1953, Serial No. 369,557

4 Claims. (Cl. 155—121)

This invention comprises novel and useful improvements in a tractor seat for farm tractors and the like, and more specifically pertains to a seat which is adjustable at the will of the operator to place the seat in a level position regardless of the angle at which the tractor is being operated.

The primary object of this invention is to provide a seat on a farm tractor of simple and inexpensive construction and one which the operator of the tractor can adjust to a level position when the tractor is being operated over uneven surfaces.

A further object is to provide a seat which is adjustable by the operator without removing his hands or feet from the controls of the tractor.

A still further object is to provide an adjustable frame on a tractor for a seat cushion and a removable seat cushion, whereby the seat cushion can be removed when not in use to preserve it from the elements.

Another object of the invention is to provide a seat which can be moved to an inoperative position to allow the operator to operate the tractor in a standing position.

A further object of the invention is to provide an adjustable seat for a tractor and the like which is rigidly mounted and provided with means for absorbing the shocks implied to the tractor.

A yet further object is to provide an adjustable seat for a tractor which can be adjusted in minute angular positions with respect to the platform of the tractor.

Another object of the invention is to provide an adjustable seat for a tractor which is equipped with resilient means for absorbing the horizontal forces of the shocks imparted to the tractor and which resilient means also exert a pressure on the adjusting means for retaining the seat in its adjusted positions.

A still further object of the invention is to provide an adjustable seat for a farm tractor which is adjustable in vertical and horizontal directions as well as in an angular direction with respect to the platform of the tractor.

These, together with the various ancillary features and objects of the invention, which will later become apparent as the following description proceeds, are attained by the present invention, preferred embodiments of which have been illustrated in the accompanying drawings, as exemplifications of the principles of the invention, wherein:

Figure 5 is a vertical longitudinal sectional view taken substantially upon the plane indicated by the section line 5—5 of Figure 3; and Figure 6 is a vertical transverse sectional view taken substantially upon the plane indicated by the section line 6—6 of Figure 5.

Attention is now directed more specifically to the accompanying drawings, wherein like numerals designate similar parts throughout the various views, and wherein the numeral 10 designates a portion of the tractor while the numeral 12 designates the seat assembly.

Figure 1:
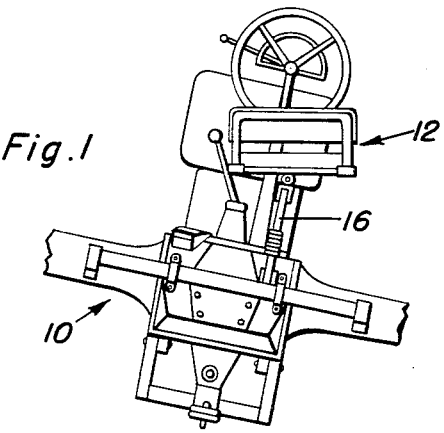
Figure 1 is a fragmentary rear end elevational view of the tractor with a seat of the present invention mounted thereon in a level position while the tractor is shown on a slope with the wheels of one side higher than the wheels of the other side.

In Figure 1, the seat assembly of the present invention is shown mounted upon a tractor and adjusted to a level position while the tractor is shown as being tilted about its longitudinal axis.

Figure 3:
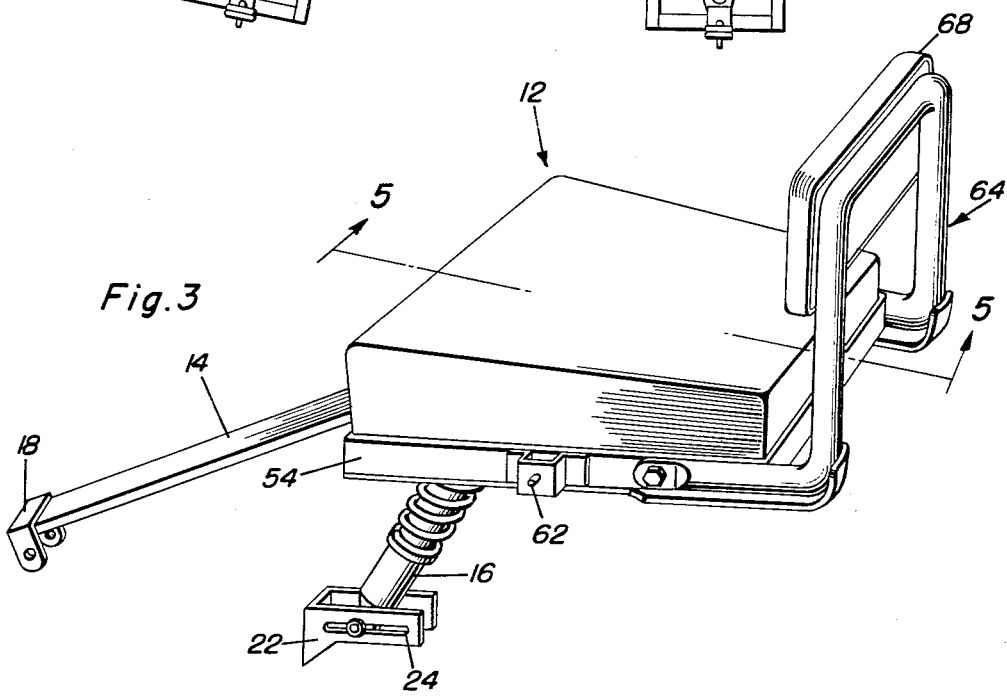
Figure 3 is a view of the complete seat assembly according to the preferred embodiment of the present invention.

Referring to Figures 3 and 5, the means for mounting the seat on the tractor comprises a pair of mounting legs 14 and 16. The leg 14 is pivotally connected to the tractor by means of a bracket 18, shown in Figure 3. A shaft 20 is rigidly secured to the upper end of leg 14, as by means of welding or the like. The leg 14 is bent adjacent its upper end so that the shaft will lie in a horizontal plane.

The leg 16 consists of a shock absorber, of conventional design, fastened at its lower end to a bracket 22. The bracket 22 is adapted to be mounted on the tractor in a fixed position by any suitable means. The bracket 22 is further provided with a longitudinal slot 24 for the reception of pin 26, which pin also passes through the lower end of leg 16. The pin 26 is provided with suitable nuts and washers whereby the end of the leg 16 can be locked in adjustment with respect to the bracket 22.

A pair of collars 28 and 30 are mounted on the shaft 20. The collar 28 has mounted thereon a bracket 32 having a longitudinal slot 34 therein. A pin 36 extends through the upper end of leg 16 and through the slot 34 for attaching the leg 16 to the bracket 32. The pin 36 is provided with suitable nuts and washers whereby it can be locked in an adjusted position along the slot 34. The collar 28 is further provided with a plurality of teeth at one end which is adjacent to the collar 30, the purpose of which will be later described.

Figure 4:
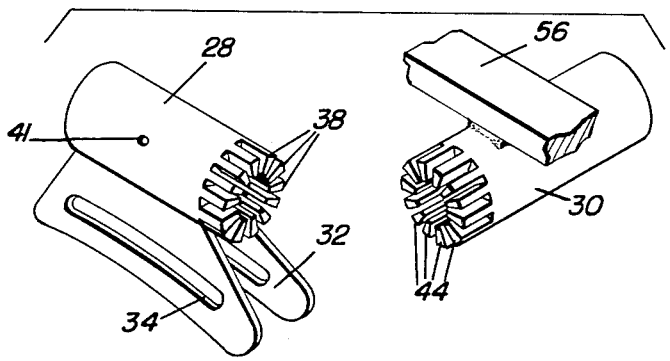
Figure 4 is an exploded perspective view of part of the means for adjusting the angle of the seat in the preferred form.

Locking means are provided for securing the collar 28 in various adjusted positions axially along the shaft 20. The locking means comprise a plurality of apertures 40 axially spaced along the shaft 20. A single aperture 41, shown in Figure 4 in the drawings, is provided in the collar 28 and is adapted to register with the apertures 40. A locking pin 42, or other suitable means, is provided, which can be inserted through the aperture in the collar 28 and into one of the apertures 40 thereby positioning the collar axially along the shaft 20.

The collar 30 is provided with a plurality of teeth 44 at its end adjacent the collar 28. The teeth 38 of collar 28 interengage with the teeth 44 of collar 30 whereby the collars are locked against angular movement relative to one another. By sliding the collar 30 axially away from the fixed collar 28, angular adjustment of the collars relative to one another is permitted. Upon reengagement of the teeth, the collars will be again locked in their predetermined relative positions.

The slidable collar 30 is urged into engagement with the collar 28 by means of a resilient spring 46 mounted upon the shaft. The end of the shaft 20 is provided with threads, as at 48, and mounted thereon are nuts 50 and 52 which lock the spring 46 in position. The pressure exerted by the spring 46 on the collar 30 is adjusted by means of the nuts 50 and 52. Thus, the collar 30 can be adjusted angularly with respect to collar 28 by first moving the collar 30 axially against the spring, rotating it to the desired position, and then allowing the pressure of the spring to cause the teeth 44, on the collar 30, to interengage with the teeth 38 on the collar 28.

A seat cushion retaining frame 54 is fixedly secured to the collar 30. This is accomplished by welding the brace 56 which is attached to the retaining frame 54 to the collar 30. Any other suitable means of fastening can be used without departing from the scope of the present invention.

The seat cushion retaining frame is composed of four lengths of angle iron joined in end-to-end relationship to form a rectangular structure. The flanges of the angle irons face inwardly to form an inwardly extending lip upon which a seat cushion rests. The seat cushion is formed of a base member, of wood or the like, having a layer of cushioning material thereon, covered by a piece of rubber impregnated nylon or the like, which is secured to the base member and retains the cushioning material thereon. The seat cushion is held on the frame by means of a pair of inwardly extending projections, indicated at 58 and 60, Figure 5, on one side of the frame and a single spring pressed inwardly extending projection 62, on the opposite side of the frame. The seat cushion base member is provided with recesses for receiving the projections. The seat cushion is placed in position by first withdrawing the spring pressed projection; then, by placing the seat cushion on the inwardly extending flanges so that the fixed projections extend into the recesses on one side of the base member, and then releasing the spring pressed projection whereby the last named projection is urged by the spring into the recess on the other side of the base member. To remove the cushion, the spring pressed projection is withdrawn and the seat is removed from the frame. There is thus provided a simple and efficient means whereby the seat cushion can be moved from the frame when not in use to preserve it from the elements.

A back rest 64 is pivotally attached to the cushion retaining frame, as at 66, the purpose of which will be later described. The back rest cushion 68 can be made removable in a manner similar to the seat cushion.

In operation, the operator adjusts the vertical position of the seat by placing the ends of the legs 16 in the desired position with respect to the slots 24 and 34. Then the nuts are tightened on the pins 26 and 36 to secure the leg in its desired adjusted position. The horizontal position of the seat is adjusted by sliding the collar 28 axially along the shaft to the desired position and then inserting pin 42 through the aperture in the collar into an aperture 40 in the shaft. Thus, the operator is provided with means for vertically and horizontally adjusting the seat on the tractor. When the tractor is being operated on the side of a hill, the wheels on one side are higher than the wheels on the other side thereby making it difficult for the operator to remain comfortably in the seat. To overcome this difficulty, the operator can, by the present invention, simply push back against the back rest against the pressure of the spring 46 and thereby disengage the teeth on the collars 24 and 30. Then, he can rotate the seat about the shaft 20 until it is in a level position and upon release of the pressure against the back rest, the spring 46 will urge the teeth on the collar 30 into engagement with the teeth on the collar 28 thereby locking the seat in its adjusted position. This adjustment can be accomplished by the operator without removing his hands or feet from the controls of the tractor.

Figure 2:
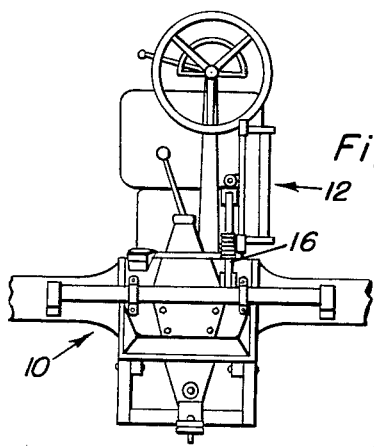
Figure 2 is a view similar to Figure 1 wherein the seat is moved to its inoperative position to allow the operator to operate the tractor from a standing position.

The back rest is pivoted so that it will lie flat against the seat cushion when the entire seat assembly is moved to an inoperative position to allow the operator to operate the tractor from a standing position, as shown in Figure 2.

It will be noted that spring 46 serves a dual purpose. One of such functions, that is, that of urging the teeth of collar 30 into engagement with the teeth of collar 28, was pointed out above. The other function is to receive and cushion shocks imparted to the tractor.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A seat structure for a vehicle comprising an upwardly inclining leg having a front end pivoted on said vehicle for vertical swinging of said leg, said leg terminating in a rear end shaft angularly related thereto to dispose said shaft substantially horizontally and being vertically swingable with said leg, a shock absorber beneath said shaft pivotally connected to said vehicle, means operatively connecting the shock absorber to said shaft for cushioning vertical movement of the shaft, a seat frame surmounting the shaft, frame supporting means slidable forwardly and rearwardly on the shaft and rotatable on the shaft to adjust said frame into level position, coacting devices on said first and second named means interlocking upon forward sliding of said frame supporting means to prevent rotary adjustment of said seat frame and unlocked upon rearward sliding of said seat supporting means to permit rotary adjustment of said frame, and spring means on said shaft operatively connected to said second named means and tending to slide said second named means forwardly.

2. A seat structure according to claim 1, said first named means including pivotal and sliding camming connections for adjusting said shaft vertically by pivoting of said shock absorber on its pivotal connection to said vehicle.

3. A seat structure according to claim 1, said devices on said first and second named means comprising intermeshing teeth.

4. A seat structure according to claim 1, said first and second named means comprising sleeves on said shaft and said interlocking devices comprising teeth on said sleeves respectively.

References Cited in the file of this patent

UNITED STATES PATENTS

| 350,135 | Jacobs | Oct. 5, 1886 |
| 364,716 | Hedges | June 14, 1887 |
| 435,385 | Babbitt | Sept. 2, 1890 |
| 918,249 | Young | Apr. 13, 1909 |
| 1,411,942 | Smith | Apr. 4, 1922 |
| 1,802,280 | Schmitt | Apr. 21, 1931 |
| 2,151,628 | Derveer | Mar. 21, 1939 |
| 2,346,895 | Bergman | Apr. 18, 1944 |
| 2,470,907 | White et al. | May 24, 1949 |
| 2,489,981 | Rose | Nov. 29, 1949 |
| 2,519,163 | Turner | Aug. 15, 1950 |
| 2,528,607 | Preising et al. | Nov. 7, 1950 |

FOREIGN PATENTS

| 807,336 | Germany | June 28, 1951 |